(12) United States Patent
Mohri

(10) Patent No.: US 11,738,459 B2
(45) Date of Patent: Aug. 29, 2023

(54) ROBOT CONTROL DEVICE, ROBOT CONTROL METHOD, AND NON-TRANSITORY COMPUTER-READABLE RECORDING MEDIUM

(71) Applicant: Panasonic Intellectual Property Management Co., Ltd., Osaka (JP)

(72) Inventor: Toshinari Mohri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 308 days.

(21) Appl. No.: 17/093,863

(22) Filed: Nov. 10, 2020

(65) Prior Publication Data

US 2021/0053223 A1 Feb. 25, 2021

Related U.S. Application Data

(63) Continuation of application No. PCT/JP2019/007078, filed on Feb. 25, 2019.

(30) Foreign Application Priority Data

May 16, 2018 (JP) ................................. 2018-094583

(51) Int. Cl.
*B25J 9/16* (2006.01)
*B25J 9/00* (2006.01)
(Continued)

(52) U.S. Cl.
CPC ........... *B25J 9/1674* (2013.01); *B25J 9/0084* (2013.01); *G05B 19/406* (2013.01); *G05B 19/4155* (2013.01); *G05B 2219/50391* (2013.01)

(58) Field of Classification Search
CPC ...... B25J 9/1674; B25J 9/1653; B25J 9/1664; B25J 9/1676; B25J 9/1666; B25J 19/06;
(Continued)

(56) References Cited

U.S. PATENT DOCUMENTS

2001/0047504 A1* 11/2001 Aoyama ............ G05B 23/0229
714/799
2002/0072826 A1* 6/2002 Watanabe ............ G05B 19/409
700/264

(Continued)

FOREIGN PATENT DOCUMENTS

EP 1 865 395 12/2007
JP 62-143105 6/1987
(Continued)

OTHER PUBLICATIONS

International Search Report dated Apr. 2, 2019 in International (PCT) Application No. PCT/JP2019/007078 with English translation.

(Continued)

*Primary Examiner* — Dale Moyer
*Assistant Examiner* — Tanner L Cullen
(74) *Attorney, Agent, or Firm* — Wenderoth, Lind & Ponack, L.L.P.

(57) ABSTRACT

Operation information on a robot is recorded in a temporary data recorder continually only for a predetermined period. The operation information for one cycle during a normal operation of the robot is retrieved from the temporary data recorder, and is recorded in a normal-state data recorder. If a storage control section determines that a predetermined trigger condition has occurred, some pieces of the operation information recorded in the temporary data recorder are recorded in the trigger-state data recorder. An operation information display displays the operation information in a (Continued)

normal state and the operation information in a trigger state so that these pieces of the operation information can be compared with each other.

6 Claims, 7 Drawing Sheets

(51) Int. Cl.
  *G05B 19/406* (2006.01)
  *G05B 19/4155* (2006.01)
(58) Field of Classification Search
  CPC .... B25J 9/0084; G05B 19/42; G05B 23/0275; G05B 19/406; G05B 19/4155; G05B 2219/39412; G05B 2219/14078; G05B 2219/40201; G05B 2219/50391; H04L 12/42; G11B 2020/10666
  See application file for complete search history.

(56) References Cited

U.S. PATENT DOCUMENTS

| | | |
|---|---|---|
| 2005/0071048 A1 | 3/2005 | Watanabe et al. |
| 2015/0112480 A1 | 4/2015 | Nakata et al. |
| 2015/0220084 A1* | 8/2015 | Kawai .................... G05B 23/00 340/3.7 |
| 2015/0328774 A1* | 11/2015 | Yajima ................... B25J 9/1676 702/183 |
| 2019/0187666 A1* | 6/2019 | Sugiyama .......... G05B 19/4065 |

FOREIGN PATENT DOCUMENTS

| | | | | |
|---|---|---|---|---|
| JP | 05-324053 | 12/1993 | | |
| JP | 2001-321949 | 11/2001 | | |
| JP | 2003-280707 | 10/2003 | | |
| JP | 2006-048398 | 2/2006 | | |
| JP | 2006-092241 | 4/2006 | | |
| JP | 3834307 | 10/2006 | | |
| JP | 2015-112631 | 6/2015 | | |
| WO | WO-2008095840 A1 * | 8/2008 | ........ | B60W 50/0205 |
| WO | WO-2018228755 A1 * | 12/2018 | ............ | G01M 13/00 |

OTHER PUBLICATIONS

Extended European Search Report dated Jun. 11, 2021 in European Patent Application No. 19804427.3.

Office Action dated May 4, 2022 in corresponding Indian Patent Application No. 202047050576.

* cited by examiner

ROBOT CONTROL DEVICE, ROBOT CONTROL METHOD, AND NON-TRANSITORY COMPUTER-READABLE RECORDING MEDIUM

CROSS-REFERENCE TO RELATED APPLICATIONS

This is a continuation of International Application No. PCT/JP2019/007078 filed on Feb. 25, 2019, which claims priority to Japanese Patent Application No. 2018-094583 filed on May 16, 2018. The entire disclosures of these applications are incorporated by reference herein.

BACKGROUND

The present disclosure relates to a robot device.

Industrial robots have been known which conduct operations, such as a welding operation and an operation for transferring products, by reproducing an action based on an associated action program set in advance by a method called a teaching playback method.

In general, such a robot can conduct only an action set in advance. For example, if an abnormal situation beyond expectation, such as a collision of the robot, an object mounted on the robot, or an object gripped by the robot, occurs, the action program cannot cope with the abnormal situation. For this reason, there is a need to allow a user to grasp circumstances at the time of occurrence of the abnormal situation later.

Japanese Unexamined Patent Publication No. S62-143105 discloses a configuration in which operational information of a numerical control unit is recorded in chronological order from the present time to the earliest time permitted by the memory capacity, and can thus be read according to necessity so that changes in the operation can be traced.

Japanese Patent No. 3834307 discloses a robot device including a visual sensor that measures the position of an object or the position and posture of an object, based on an instruction from a robot, and transfers a result of this measurement to the robot. If a previously defined alarm is raised to the robot in operation, the robot device notifies the visual sensor of the raising of the alarm, and records, as robot history information, an operational status of the robot at that point in time.

SUMMARY

However, according to the invention of Japanese Unexamined Patent Publication No. S62-143105, when an abnormal situation, such as a system failure, occurs, data blocks listed in an empty data block list are sequentially read to obtain operation information up to when the system failure occurs. It takes time to track down the cause of the system failure.

The invention of Japanese Patent No. 3834307 is configured to record data indicating an operational status of a robot when an abnormal situation occurs in the robot. Only limited pieces of information, such as the time of day at which the abnormal situation occurred, a program that was being executed at that time, and the position of the robot, can be obtained. This makes it difficult to obtain the specific cause and process that leads to the occurrence of the abnormal situation.

For example, if the robot is used for welding, there is not enough chronological information, such as welding conditions that affect the quality of a product, provided. This makes it difficult to track down the cause of the occurrence of the abnormal situation. Even if the abnormal situation is caused by a combination of factors, such as a human error and a software bug, merely grasping circumstances at the moment of the occurrence of the abnormal situation results in difficulty in tracking down the cause.

In view of the foregoing background, it is an object of the present disclosure to easily track down the cause of an abnormal situation that has occurred in a robot.

An aspect of the present disclosure is directed to a robot device that controls a robot so as to repeat a predetermined action cyclically and records operation information indicating an operational status of the robot, and provides the following solution.

Specifically, a robot device according to a first aspect includes: a normal-state data recorder that records the operation information for one cycle during a normal operation of the robot;

a determination section that determines whether a predetermined trigger condition has occurred;

a trigger-state data recorder that records, if a determination is made that the trigger condition has occurred, the operation information at least at a point in time of occurrence of the trigger condition; and a display that displays the operation information recorded in each of the normal-state data recorder and the trigger-state data recorder.

In the first aspect, the operation information for one cycle during the normal operation of the robot is recorded in the normal-state data recorder. If a determination is made that a predetermined trigger condition has occurred, the operation information at least at the point in time of the occurrence of the trigger condition is recorded in the trigger-state data recorder. The display displays the operation information recorded in each of the normal-state data recorder and the trigger-state data recorder.

As can be seen, if an abnormal situation has occurred in the operation of the robot, it is possible to determine a process leading to the occurrence of the abnormal situation and circumstances and progress of the abnormal situation through a comparison between the operation information recorded in the trigger-state data recorder and the operation information recorded in the normal-state data recorder. This enables efficient recovery from the abnormal situation and efficient tracking down of the cause of the abnormal situation.

Thus, displaying the operation information in the normal state and the operation information in the trigger state in graph form and superimposing them on each other, or displaying them side by side, for example, facilitates comparing these pieces of operation information with each other. Thus, the user can visually check the comparison and easily track down the cause of the occurrence of an abnormal situation.

Examples of the operation information may include the model name of the robot, the posture (positional information) of the robot, the welding waveforms (current, voltage, and motor current), load information on the servomotors, codes indicating details of errors, quality information on welding, information on the program executed, the number of times the program is executed, production information, a lapse of time from the start of the program, and the hours of operation of the robot.

A second aspect is an embodiment of the first aspect. In the second aspect, the robot device further includes:

a timing recorder that records a timing of occurrence of the trigger condition during an operation of the robot for one cycle, wherein the determination section determines that the trigger condition occurs at a same timing as the timing of the occurrence of the trigger condition, in an operation of the robot for each of next and subsequent cycles.

According to the second aspect, the timing of the occurrence of the trigger condition during the operation of the robot for one cycle is recorded, and a determination is made that the trigger condition occurs at the same timing as the recorded timing in an operation of the robot for each of the next and subsequent cycles.

Specifically, if the robot is restored after an abnormal situation has occurred in the operation of the robot and is again operated, an abnormal situation is highly likely to occur at the same timing as in the previous cycle. Thus, the trigger condition is generated at the same timing as in the previous cycle, and the operation information at the point in time at which the trigger condition has occurred is recorded. As a result, the operation information at a timing at which an abnormal situation easily occurs is accumulated. This enables efficient recovery from the abnormal situation and efficient tracking down of the cause of the abnormal situation.

A third aspect is an embodiment of the first or second aspect. In the third aspect, the robot includes a plurality of robots, the normal-state data recorder records the operation information for one cycle during normal operations of the robots, the determination section is configured to determine whether the trigger condition has occurred in at least one of the robots, and the trigger-state data recorder records, if a determination is made that the trigger condition has occurred, the operation information at least at a point in time of occurrence of the trigger condition.

In the third aspect, the operation information for one cycle during the normal operations of the robots is recorded in the normal-state data recorder. If a determination is made that a predetermined trigger condition has occurred in at least one of the robots, the operation information at least at the point in time of the occurrence of the trigger condition is recorded in the trigger-state data recorder.

In this configuration, it is possible to determine, based on the operation information, the positional relation among the robots and the status of peripheral devices at the time of occurrence of the abnormal situation, which cannot be obtained with reference to only an error history recorded in the respective robots in the case in which a plurality of robots are performing operations simultaneously.

According to an aspect of the present disclosure, if an abnormal situation occurs in an operation of a robot, the cause of the abnormal situation can be easily tracked down.

DETAILED DESCRIPTION

Embodiments of the present disclosure will be described in detail with reference to the drawings. Note that the following description of embodiments is merely an example in nature, and is not intended to limit the scope, applications, or use of the present disclosure.

Figure 1:
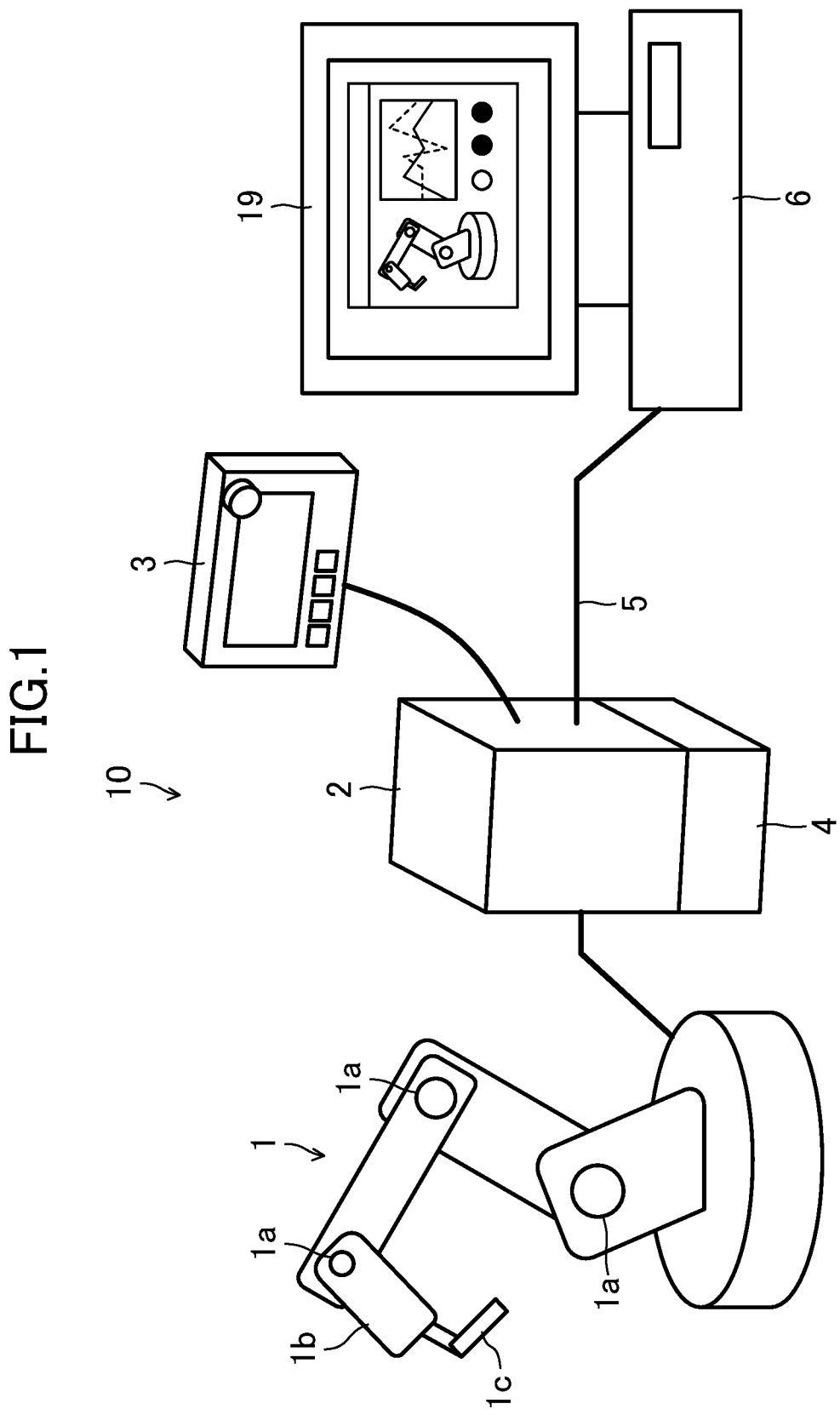
FIG. 1 is a schematic diagram showing a configuration of a robot device according to an embodiment.

As illustrated in FIG. 1, a robot device 10 includes a robot 1 serving as an object to be monitored, and a server 6 serving as an information processor that receives and processes operation information indicating an operational status of the robot 1.

The robot 1 is configured as a multi-axis articulated robot having a plurality of servomotors 1a. A welding torch 1c and a wire feeder (not shown) are attached to the distal end of a robot arm 1b. Note that configurations of the robot 1, such as the number of joint axes, a horizontally articulated type, or a vertically articulated type, may be appropriately selected depending on applications.

The robot 1 is connected to a controller 2. A teaching pendant 3, a welding controller 4, and an external device 15 (see FIG. 2) are connected to the controller 2. The controller 2 transmits and receives data to and from the teaching pendant 3, the welding controller 4, and the external device 15. In this embodiment, examples of the external device 15 include various sensors and an alarm lamp.

The teaching pendant 3 is a device operated by a user to define, e.g., actions of the robot 1 and welding conditions, and configured to display information on the robot 1 transmitted from the controller 2. Note that the teaching pendant 3 and the controller 2 may be connected to each other via wired or wireless communication. The teaching pendant 3 may be integrated with the controller 2.

The welding controller 4 outputs a control signal in response to a process performed by the controller 2, and controls actions of the welding torch 1c and the wire feeder attached to the robot 1. Note that the welding controller 4 may be configured independently of the controller 2.

The controller 2 is connected to the server 6 via a network cable 5. The controller 2 and the server 6 are typically connected to each other by Ethernet®. However, serial communication, parallel communication, an analog signal, or any other method may be used. A repeater, such as a hub or a router, may be provided. The controller 2 and the server 6 may be connected to each other via wireless communication.

The server 6 is provided with an operation information display 19 serving as a display monitor. The operation information display 19 displays the operation information indicating the operational status of the robot 1, such as three-dimensional data indicating the present position of the robot 1, welding waveforms, and action lamps.

The operation information on the robot 1 may include the model name of the robot 1, the posture of the robot 1, load information on the servomotors 1a, codes indicating details of errors, quality information on welding, the number of times a program is executed, production information, and the hours of operation of the robot 1.

Figure 2:
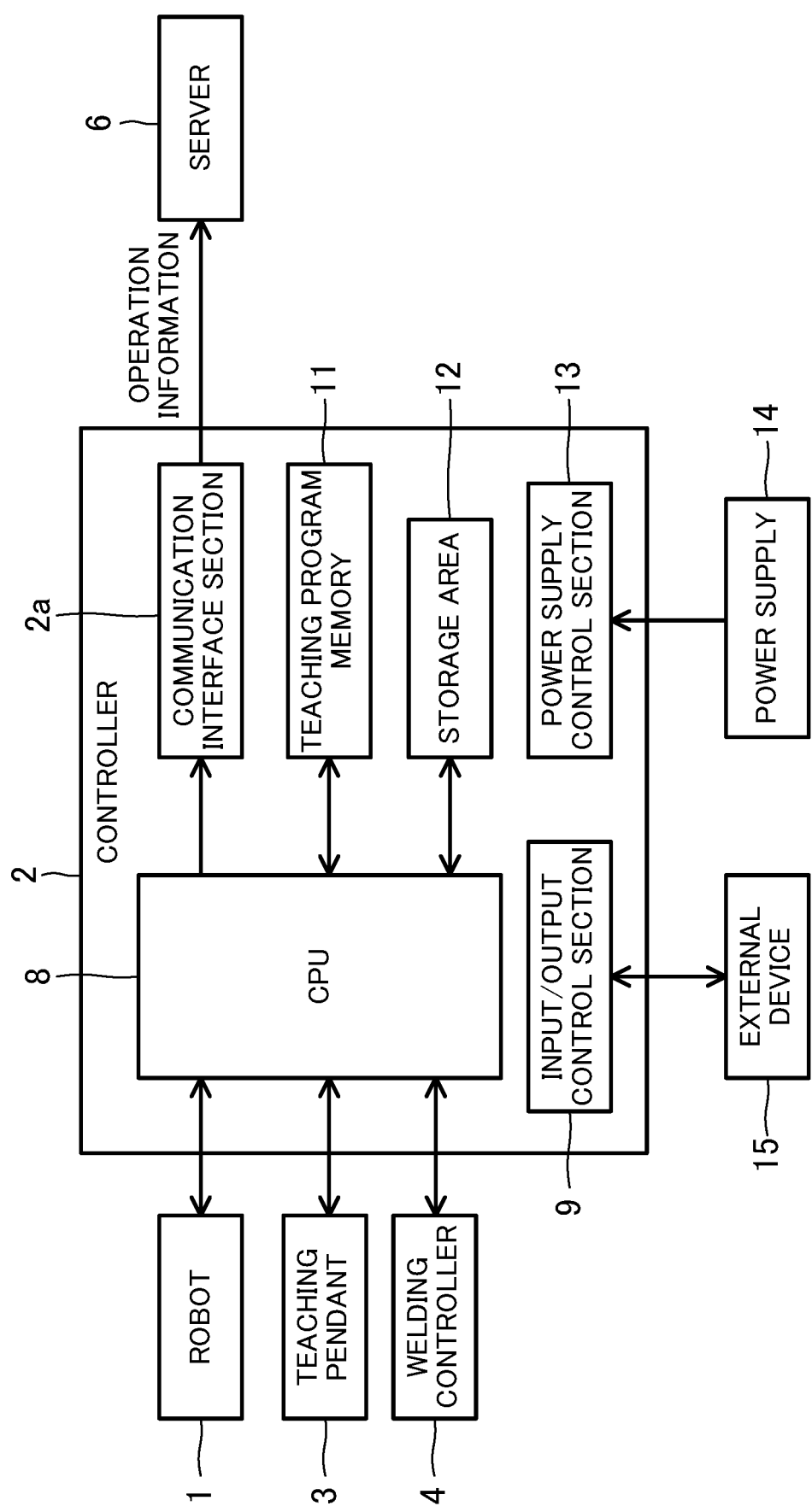
FIG. 2 is a block diagram showing an internal configuration of a controller.

As shown in FIG. 2, the controller 2 operates with electric power supplied from a power supply 14 to a power supply control section 13.

A central processing unit (CPU) 8 controls the entire system in response to an instruction from the teaching pendant 3, a teaching program executed in a teaching program memory 11, and a predetermined control sequence stored in a storage area 12.

The CPU 8 calculates the position of the tip of the torch 1c of the robot 1 in an orthogonal coordinate system, based on the detection angles respectively transmitted by drivers of the servomotors 1a of the robot 1, using values indicating, e.g., the properties of the servomotors 1a and the value of the arm length of the robot 1, which are stored in the storage area 12, and using forward kinematics calculation.

An input/output control section 9 acquires and transmits information on the external device 15 connected to the controller 2 in response to a process performed by the CPU 8.

After the power supply 14 is turned on, and connection between a communication interface section 2a and the server 6 is established, the communication interface section 2a transmits the operation information on the robot 1 collected by the CPU 8 to the server 6 at regular intervals.

In this embodiment, as the operation information indicating the operational status of the robot 1, necessary information, such as information on the settings of the robot 1, the present position thereof, welding conditions, and input/output information, are selected from among pieces of information handled by the controller 2.

Figure 3:
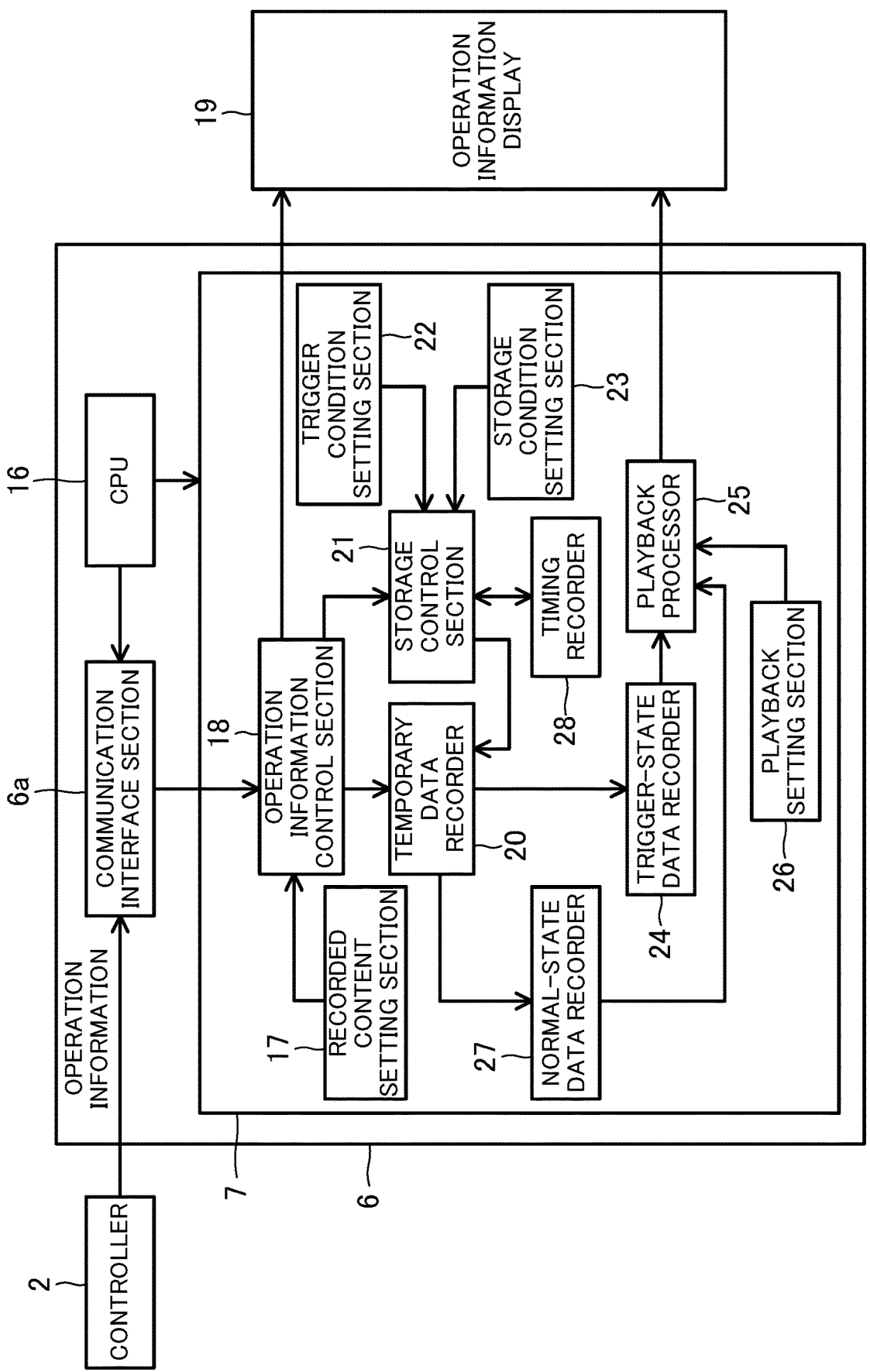
FIG. 3 is a block diagram showing an internal configuration of a server.

As shown in FIG. 3, the operation information transmitted from the controller 2 is received in a communication interface section 6a of the server 6, and is sent to an operation information control section 18 included in an information processor 7 implemented as a monitoring application. Actions of the communication interface section 6a and the information processor 7 are controlled based on an instruction from a CPU 16.

For example, the operation information control section 18 decodes and filters the operation information according to details set by a recorded content setting section 17. The recorded content setting section 17 specifies, for example, an IP address of the robot 1 on which the operation information is to be acquired, or sets the time interval between receptions of the operation information.

The operation information control section 18 transmits the operation information to the operation information display 19, shows the operation information to the user, and transmits the operation information to a temporary data recorder 20.

Figure 4:
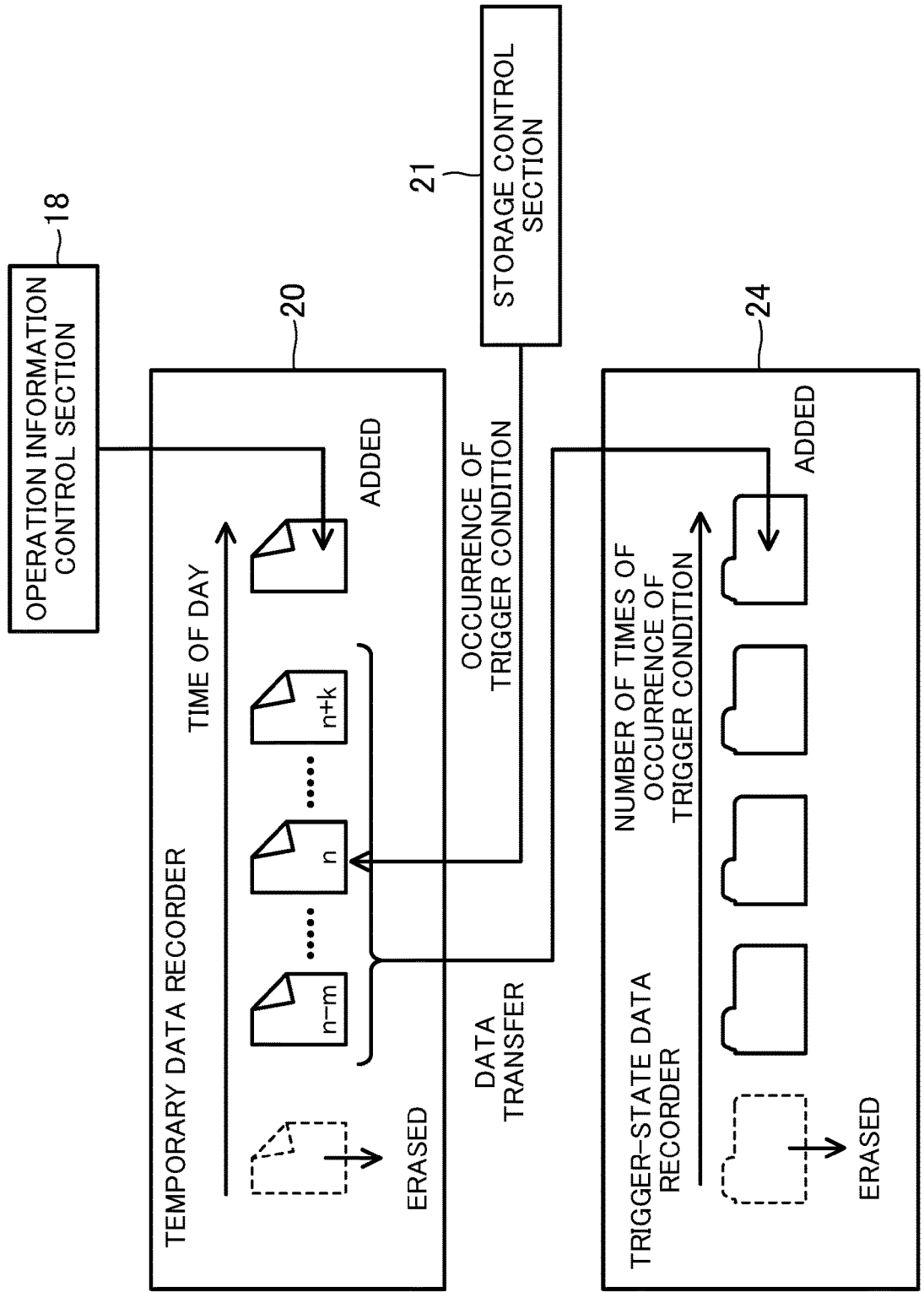
FIG. 4 is a schematic diagram illustrating a procedure for recording some pieces of operation information in a trigger-state data recorder.

As illustrated in FIG. 4, the temporary data recorder 20 has a ring buffer structure. When acquiring new operation information from the operation information control section 18, the temporary data recorder 20 erases the oldest operation information data recorded by the temporary data recorder 20. This configuration allows a fixed volume of operation information to be retained continually.

The volume of data retained continually in the temporary data recorder 20 is determined based on details set by a storage condition setting section 23 (e.g., criteria, such as time, the number of samples, and data size).

While the controller 2 and the server 6 communicate with each other, a data loss or fluctuations in the communication intervals may occur. Thus, an identifier representing a time of day is added to data in storing the data in the temporary data recorder 20. The controller 2 may transmit data to which the identifier representing the associated time of day has been added.

The robot 1 is controlled so as to cyclically repeat a predetermined action. The operation information for one cycle during the normal operation of the robot 1 is retrieved from the temporary data recorder 20, and is recorded in a normal-state data recorder 27. The operation information for one cycle during the normal operation of the robot 1 may be recorded by the user at any point in time, or may be automatically recorded only once during operation of a teaching program.

As shown in FIG. 3, a storage control section 21 compares the status specified in advance by a trigger condition setting section 22 with the present operational status of the robot 1 notified from the operation information control section 18. In other words, the storage control section 21 constitutes a determination section configured to determine whether a predetermined trigger condition has occurred. Examples of the trigger condition include a condition where an error has occurred in an operation of the robot 1, a condition where changes occur in the input/output control section 9, and a condition where a predetermined number of hours of operation has elapsed (e.g., every hour).

If the storage control section 21 determines that the trigger condition specified by the trigger condition setting section 22 occurs, the storage control section 21 retrieves, from the ring buffer of the temporary data recorder 20, the operation information corresponding to a predetermined period from before the occurrence of the trigger condition to after the occurrence of the trigger condition, including the point in time at which the trigger condition has occurred, and transfers the retrieved operation information to a trigger-state data recorder 24.

The timing of occurrence of the trigger condition during the operation of the robot 1 for one cycle, i.e., the amount of time elapsed from the start of the operation of the robot 1 for a cycle to the point in time at which the trigger condition occurs, is recorded in a timing recorder 28. Information indicating the timing of occurrence recorded in the timing recorder 28 is used in an operation of the robot 1 for each of the next and subsequent cycles in order to generate the trigger condition at the same timing as the previous timing of the occurrence of the trigger condition.

As illustrated in FIG. 4, for example, if the trigger condition occurs at the point in time at which the temporary data recorder 20 records the $n^{th}$ piece of data, the temporary data recorder 20 waits for the $(n+k)^{th}$ piece of data to be stored thereafter, and transfers these pieces of data to the trigger-state data recorder 24 together with data older than the $n^{th}$ piece of data up to the $(n-m)^{th}$ piece of data. Note that k and m are designated by the storage condition setting section 23. The operation information corresponding to time before and after the occurrence of the trigger condition can thus be stored.

The trigger-state data recorder 24 has a ring buffer structure just like the temporary data recorder 20. If the volume of the recorded operation information is greater than or equal to a predetermined volume, the trigger-state data recorder 24 erases data in sequential order from the data stored at the earliest date and time. Thus, a fixed number of pieces of the latest data, among the data transferred from the temporary data recorder 20, can be retained continually. If the number of files of the operation information reaches and exceeds a predetermined value, the files may be erased in sequential order from the file stored at the earliest date and time.

As shown in FIG. 3, the data stored in the trigger-state data recorder 24 and the data stored in the normal-state data recorder 27 are read by a playback processor 25, and are displayed on the operation information display 19. In this case, the time intervals at which the display is updated are adjusted based on the above-described identifier representing the time of day, and a time series of the recorded data at the time of recording is reproduced.

The operation information display 19 can select which of the present operation information acquired by the operation information control section 18 or the operation information in an abnormal state acquired by the playback processor 25 is to be displayed. Note that a display for playback only may be provided independently of the operation information display 19.

The user can designate the action of the playback processor 25 using a playback setting section 26. In one preferred embodiment, the playback processor 25 is designed to be able to pause, fast-forward, and rewind playback, and seek for data to be reproduced.

In displaying the operation information recorded in each of the normal-state data recorder 27 and the trigger-state data recorder 24 on the operation information display 19, the operation information in the normal state and the operation information in the trigger state may be displayed in graph form and superimposed on each other, or may be displayed side by side. This makes it easier to compare the operation information in the normal state with the operation information in the trigger state. Thus, the user can visually check this comparison and easily track down the cause of the occurrence of an abnormal situation.

A procedure for acquiring operation information for one cycle in a normal operation of the robot 1 will now be described with reference to the flowchart shown in FIG. 5.

Figure 5:
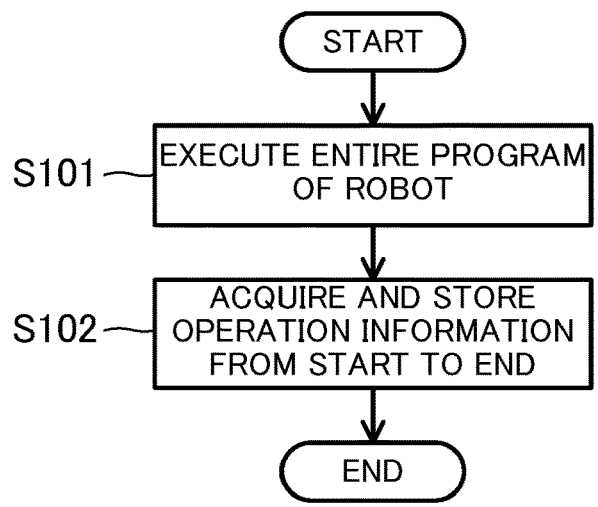
FIG. 5 is a flowchart illustrating a procedure for acquiring the operation information for one cycle during a normal operation of a robot.

As shown in FIG. 5, in step S101, an entire program of the robot 1 is executed. Then, the process proceeds to step S102.

In step S102, operation information from the start to end of a cyclic operation of the robot 1 is acquired, and is recorded in the normal-state data recorder 27. Then, the process ends.

Next, a procedure for acquiring when a trigger condition occurs in an operation of the robot 1 for one cycle will be described with reference to the flowchart shown in FIG. 6.

Figure 6:
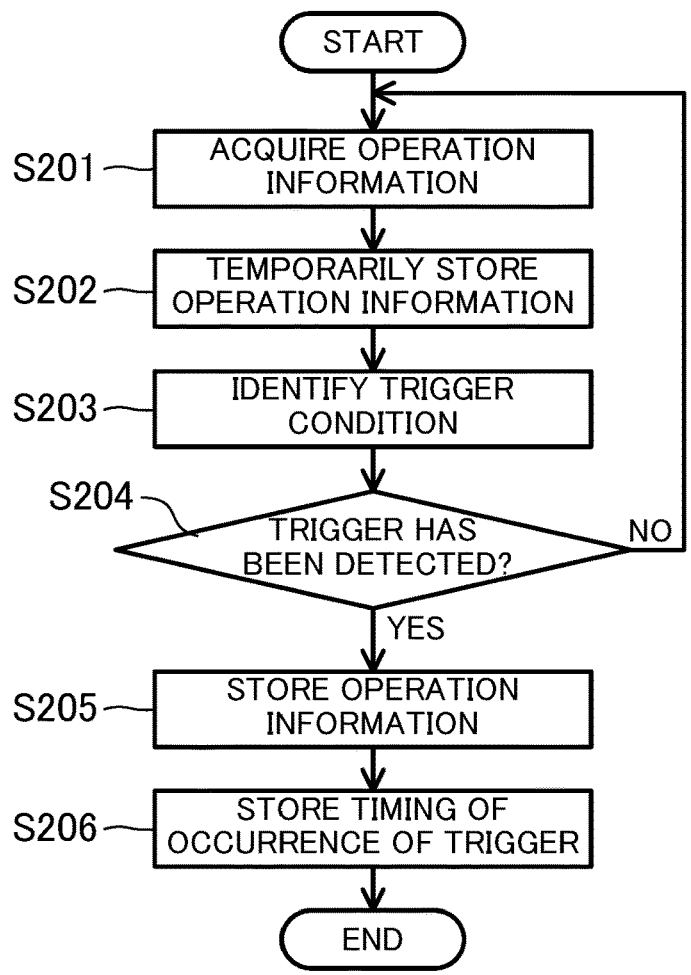
FIG. 6 is a flowchart illustrating a procedure for acquiring at which timing in an operation of the robot for one cycle a trigger condition has occurred.

As shown in FIG. 6, in step S201, operation information on the robot 1 is acquired. Then, the process proceeds to step S202.

In step S202, the acquired operation information is temporarily recorded in the temporary data recorder 20. Then, the process proceeds to step S203.

In step S203, the trigger condition is identified. Then, the process proceeds to step S204.

In step S204, a determination is made whether the trigger condition has been detected. If it is YES at step S204, the process proceeds to step S205. If it is NO at step S204, the process returns to step S201.

In step S205, the operation information corresponding to a predetermined period from before the occurrence of the trigger condition to after the occurrence of the trigger condition, including the point in time at which the trigger condition has occurred, is recorded in the trigger-state data recorder 24. Then, the process proceeds to step S206.

In step S206, the timing of occurrence of the trigger condition is recorded in the timing recorder 28. Then, the process ends.

Next, a procedure for displaying a comparison between operation information in a normal state and operation information in a trigger state will be described with reference to the flowchart shown in FIG. 7.

Figure 7:
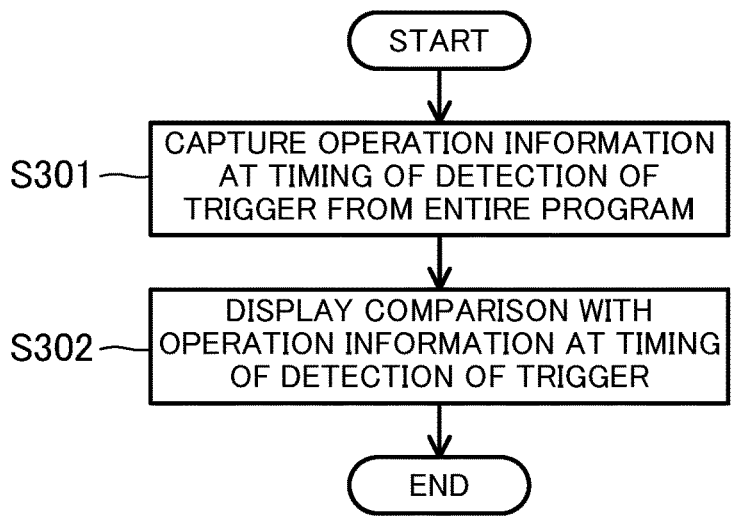
FIG. 7 is a flowchart illustrating a procedure for indicating a comparison between operation information in a normal state and operation information in a trigger state.

As shown in FIG. 7, in step S301, information at the timing of occurrence of the trigger condition is captured from the entire program, i.e., from the operation information on the robot 1 for one cycle. Then, the process proceeds to step S302.

In step S302, a comparison between the operation information in the normal state and the operation information in the trigger state is displayed on the operation information display 19. Then, the process ends.

Thus, displaying the operation information in the normal state and the operation information in the trigger state in graph form and superimposing them on each other, or displaying them side by side, for example, facilitates comparing these pieces of operation information with each other. Thus, the user can visually check the comparison and easily track down the cause of the occurrence of an abnormal situation.

Next, a procedure for recording the operation information at the same timing at which the trigger condition has occurred, in an operation of the robot 1 for each of the next and subsequent cycles will be described with reference to the flowchart shown in FIG. 8.

Figure 8:
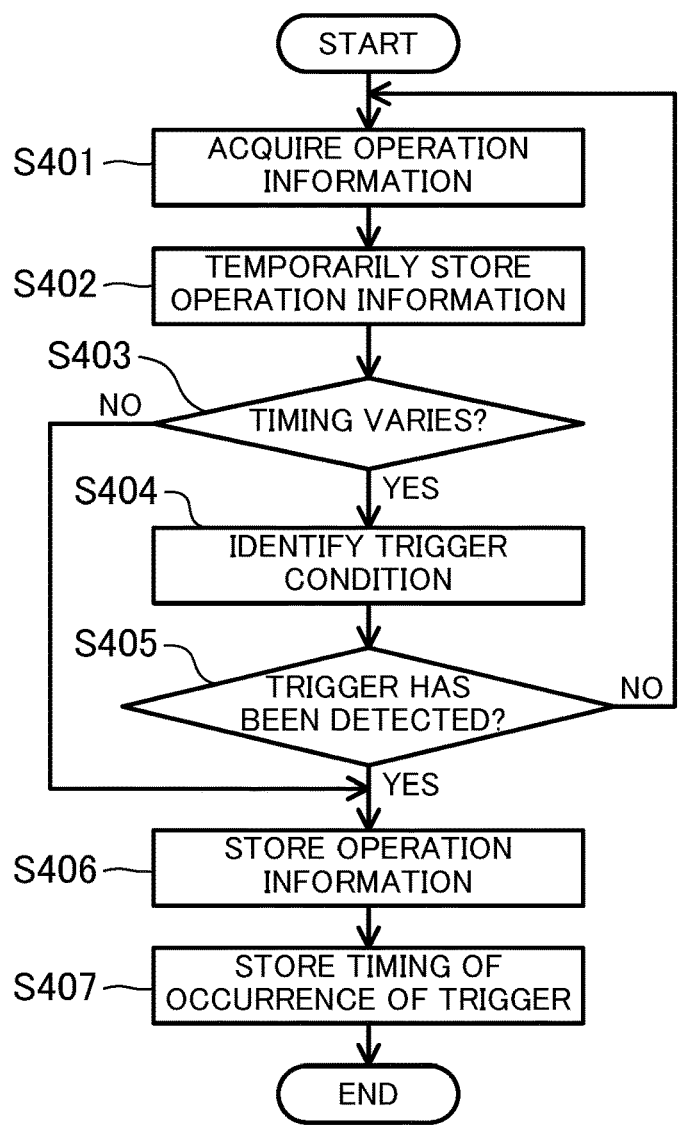
FIG. 8 is a flowchart illustrating a procedure for recording the operation information at the same timing at which the trigger condition has occurred, in an operation of the robot for each of next and subsequent cycles.

As shown in FIG. 8, in step S401, operation information on the robot 1 is acquired. Then, the process proceeds to step S402.

In step S402, the acquired operation information is temporarily recorded in the temporary data recorder 20. Then, the process proceeds to step S403.

In step S403, a determination is made whether the timing of occurrence of the trigger condition varies among cycles. If it is YES at step S403, the process proceeds to step S404. If it is NO at step S403, the process proceeds to step S406.

In step S404, the trigger condition is identified. Then, the process proceeds to step S405.

In step S405, a determination is made whether the trigger condition has been detected. If it is YES at step S405, the process proceeds to step S406. If it is NO at step S405, the process returns to step S401.

In step S406, the operation information corresponding to a predetermined period from before the occurrence of the trigger condition to after the occurrence of the trigger condition, including the point in time at which the trigger condition has occurred, are recorded in the trigger-state data recorder 24. Then, the process proceeds to step S407.

In step S407, the timing of occurrence of the trigger condition is recorded in the timing recorder 28. Then, the process ends.

As can be seen, the timing of occurrence of the trigger condition during the operation of the robot 1 for one cycle is recorded so that a determination be made that the trigger condition occurs at the same timing as the recorded timing in an operation of the robot 1 for each of the next and subsequent cycles.

Specifically, if the robot 1 is restored after an abnormal situation has occurred in the operation of the robot 1 and is again operated, an abnormal situation is highly likely to occur at the same timing as in the previous cycle. Thus, the trigger condition is generated at the same timing as in the previous cycle, and the operation information at the point in time at which the trigger condition has occurred is recorded.

As a result, the operation information at a timing at which an abnormal situation easily occurs is accumulated. This enables efficient recovery from the abnormal situation and efficient tracking down of the cause of the abnormal situation.

As can be seen from the foregoing description, according to the robot device 10 of this embodiment, if an abnormal situation has occurred in the operation of the robot 1, it is possible to determine a process leading to the occurrence of the abnormal situation and circumstances and progress of the abnormal situation through a comparison between the operation information recorded in the trigger-state data recorder 24 and the operation information recorded in the normal-state data recorder 27. This enables efficient recovery from the abnormal situation and efficient tracking down of the cause of the abnormal situation.

Other Embodiments

The embodiments described above may be modified as follows.

Figure 9:
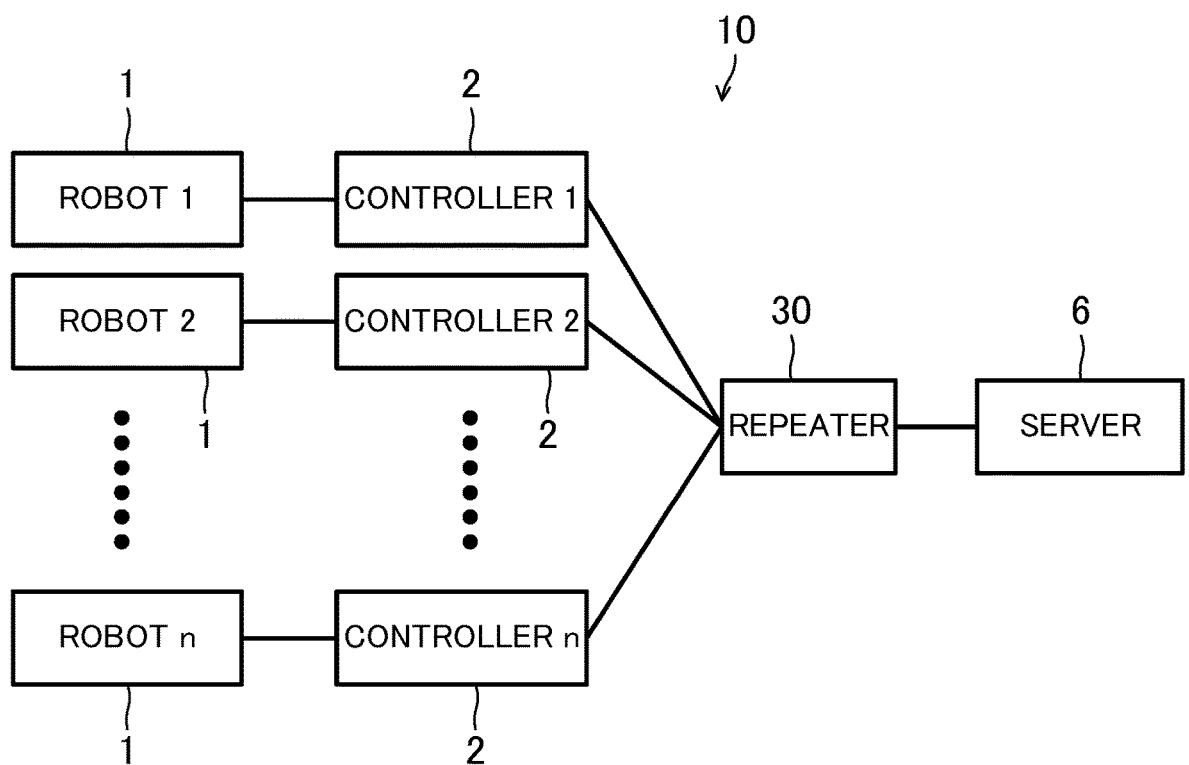
FIG. 9 is a schematic diagram showing a configuration of a robot device according to another embodiment.

In this embodiment, the number of the robot 1 and the number of the server 6 are each one. However, as shown in FIG. 9, for example, a plurality of robots 1 and a server 6 may be connected together through a repeater 30.

The server 6 receives and processes a plurality of pieces of operation information corresponding to the robots 1. Specifically, the temporary data recorder 20 records the pieces of operation information only for a predetermined period continually. Then, pieces of operation information for one cycle during the normal operations of the robots 1 are retrieved from the temporary data recorder 20, and are recorded in the normal-state data recorder 27.

The storage control section 21 determines whether a trigger condition has occurred in at least one of the robots 1. If it is determined that the trigger condition has occurred, the trigger-state data recorder 24 receives and records some of the pieces of operation information recorded in the temporary data recorder 20.

In this configuration, it is possible to determine, based on the pieces of operation information, the positional relation among the robots 1 and the status of peripheral devices at the time of occurrence of the abnormal situation, which cannot be obtained with reference to only an error history recorded in the respective robots 1 in the case in which a plurality of robots 1 are performing operations simultaneously.

As can be seen from the foregoing description, according to the present disclosure, it is possible to track down the cause of an abnormal situation occurring in a robot easily, which is very practical and useful and therefore highly applicable in the industry.

What is claimed is:

1. A robot control device that controls a robot so as to repeat a predetermined action cyclically and records operation information indicating an operational status of the robot, the robot control device comprising:
   a memory configured to store a program;
   a processor configured to execute the program and control the robot control device to perform:
   recording the operation information for one cycle during a normal operation of the robot;
   determining whether a predetermined trigger condition has occurred;
   recording, if a determination is made that the trigger condition has occurred, the operation information at least at a point in time of occurrence of the trigger condition;
   displaying the operation information recorded in each of the normal operation and the point in time of occurrence of the trigger condition;
   recording a timing of occurrence of the trigger condition during an operation of the robot for one cycle, wherein
   the processor is further configured to control the robot control device to perform determining that a subsequent trigger condition occurs at a same timing as the timing of the occurrence of the trigger condition, in an operation of the robot for each of next and subsequent cycles by monitoring the operational status of the robot at the same timing for each of the next and subsequent cycles even after an abnormal situation has occurred during the one cycle and the robot has recovered from the abnormal situation, and
   the processor is further configured to control the robot control device to perform controlling the robot so as to repeat the predetermined action cyclically even after the abnormal situation has occurred during the one cycle and the robot has recovered from the abnormal situation.

2. The robot control device of claim 1, wherein the robot includes a plurality of robots, and
   the processor is further configured to control the robot control device to perform:
   recording the operation information for one cycle during normal operations of the robots,
   determining whether the trigger condition has occurred in at least one of the robots, and
   recording, if a determination is made that the trigger condition has occurred, the operation information at least at a point in time of occurrence of the trigger condition.

3. A robot control method that controls a robot so as to repeat a predetermined action cyclically and records operation information indicating an operational status of the robot, the robot control method comprising:
   recording the operation information for one cycle during a normal operation of the robot;
   determining whether a predetermined trigger condition has occurred;
   recording, if a determination is made that the trigger condition has occurred, the operation information at least at a point in time of occurrence of the trigger condition;
   displaying the operation information recorded in each of the normal operation and the point in time of occurrence of the trigger condition;
   recording a timing of occurrence of the trigger condition during an operation of the robot for one cycle;
   determining that a subsequent trigger condition occurs at a same timing as the timing of the occurrence of the trigger condition, in an operation of the robot for each of next and subsequent cycles by monitoring the operational status of the robot at the same timing for each of the next and subsequent cycles even after an abnormal situation has occurred during the one cycle and the robot has recovered from the abnormal situation, and
   controlling the robot so as to repeat the predetermined action cyclically even after the abnormal situation has occurred during the one cycle and the robot has recovered from the abnormal situation.

4. The robot control method of claim 3, wherein the robot includes a plurality of robots, and
   the robot control method comprises:
   recording the operation information for one cycle during normal operations of the robots, determining whether the trigger condition has occurred in at least one of the robots, and recording, if a determination is made that the trigger condition has occurred, the operation information at least at a point in time of occurrence of the trigger condition.

5. A non-transitory computer-readable recording medium storing a computer program causing a computer to execute a robot control method that controls a robot so as to repeat a predetermined action cyclically and records operation information indicating an operational status of the robot, the robot control method comprising:

recording the operation information for one cycle during a normal operation of the robot;

determining whether a predetermined trigger condition has occurred;

recording, if a determination is made that the trigger condition has occurred, the operation information at least at a point in time of occurrence of the trigger condition;

displaying the operation information recorded in each of the normal operation and the point in time of occurrence of the trigger condition;

recording a timing of occurrence of the trigger condition during an operation of the robot for one cycle;

determining that a subsequent trigger condition occurs at a same timing as the timing of the occurrence of the trigger condition, in an operation of the robot for each of next and subsequent cycles by monitoring the operational status of the robot at the same timing for each of the next and subsequent cycles even after an abnormal situation has occurred during the one cycle and the robot has recovered from the abnormal situation, and controlling the robot so as to repeat the predetermined action cyclically even after the abnormal situation has occurred during the one cycle and the robot has recovered from the abnormal situation.

6. The non-transitory computer-readable recording medium according to claim 5, wherein the robot includes a plurality of robots, and the robot control method comprises:

recording the operation information for one cycle during normal operations of the robots, determining whether the trigger condition has occurred in at least one of the robots, and recording, if a determination is made that the trigger condition has occurred, the operation information at least at a point in time of occurrence of the trigger condition.

* * * * *